United States Patent [19]

Hicks et al.

[11] 4,326,840
[45] Apr. 27, 1982

[54] WAVE DRIVEN PUMP

[75] Inventors: Douglas C. Hicks, Newark, Del.; Charles M. Pleass, Havre de Grace, Md.

[73] Assignee: University of Delaware, Newark, Del.

[21] Appl. No.: 129,037

[22] Filed: Mar. 10, 1980

[51] Int. Cl.³ .............................................. F03B 3/12
[52] U.S. Cl. ..................................... 417/331; 417/467
[58] Field of Search ............... 417/330, 331, 333, 478, 417/479, 480, 472, 469; 92/87; 60/504, 497

[56] References Cited

U.S. PATENT DOCUMENTS

| | | | |
|---|---|---|---|
| 961,401 | 6/1910 | Bonney | 417/331 |
| 3,030,893 | 4/1962 | Shaffer | |
| 3,040,667 | 6/1962 | Shaffer | 417/331 |
| 3,148,509 | 9/1964 | Laurle | |
| 3,193,260 | 7/1965 | Lamb | |
| 3,502,035 | 3/1970 | Fedit | 417/480 |
| 3,580,695 | 5/1971 | Tumba | 417/330 |
| 3,598,505 | 8/1971 | Greene | 417/330 |
| 3,758,083 | 9/1973 | Palmer | 417/331 X |
| 3,965,364 | 6/1976 | Gustufson | 417/331 X |
| 4,023,515 | 5/1977 | Tharaldson | 417/332 X |
| 4,076,493 | 2/1978 | Welezer | 60/497 |
| 4,189,379 | 2/1980 | Finley | 426/2 X |
| 4,196,591 | 4/1980 | Wallace | 417/332 X |

FOREIGN PATENT DOCUMENTS 52-29549  5/1977  Japan ................................... 417/330

*Primary Examiner*—Richard E. Gluck

[57] ABSTRACT

A wave driven pump includes a buoyant wave follower having an elongated hollow body member depending therefrom with a piston in the body member. The remote end of the body member or cylinder is moored to the sea floor, and the piston is also moored so as to maintain its vertical position generally constant. Means are provided to permit the portion of the cylinder containing the piston to move up and down with respect to the piston in response to wave movements so that a pumping action results to pump water from a pumping chamber in the cylinder upstream from the piston.

10 Claims, 6 Drawing Figures

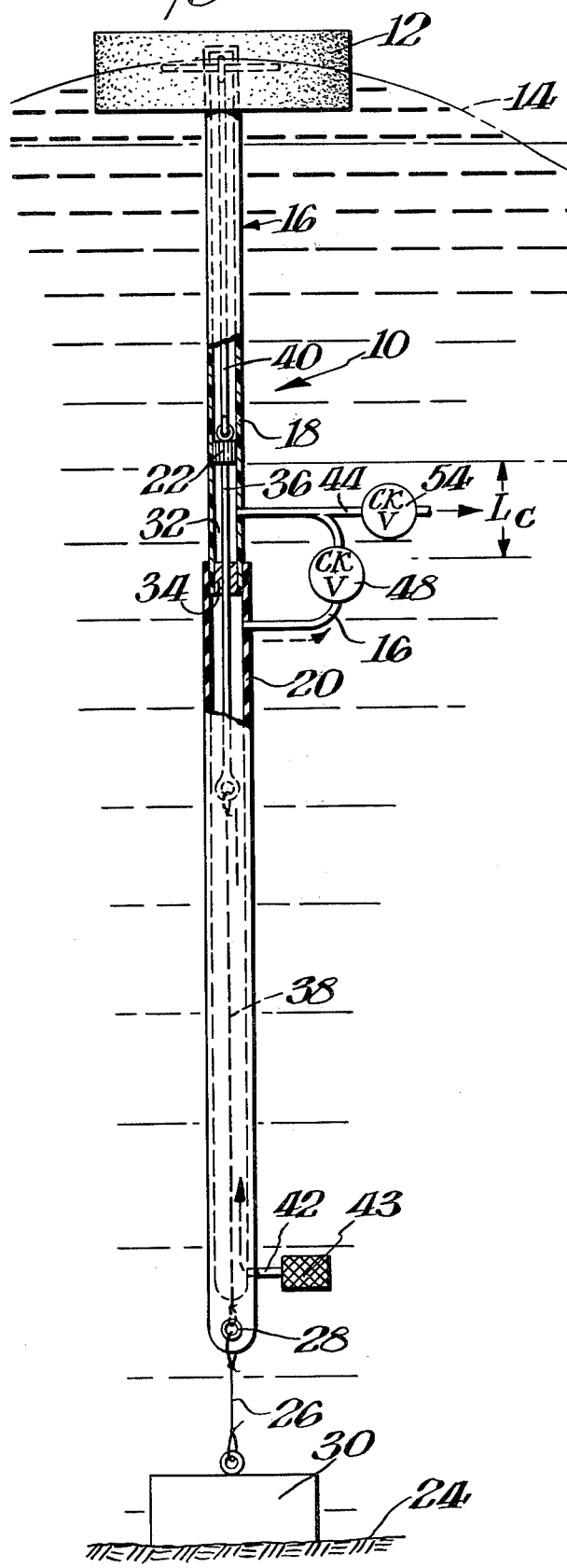
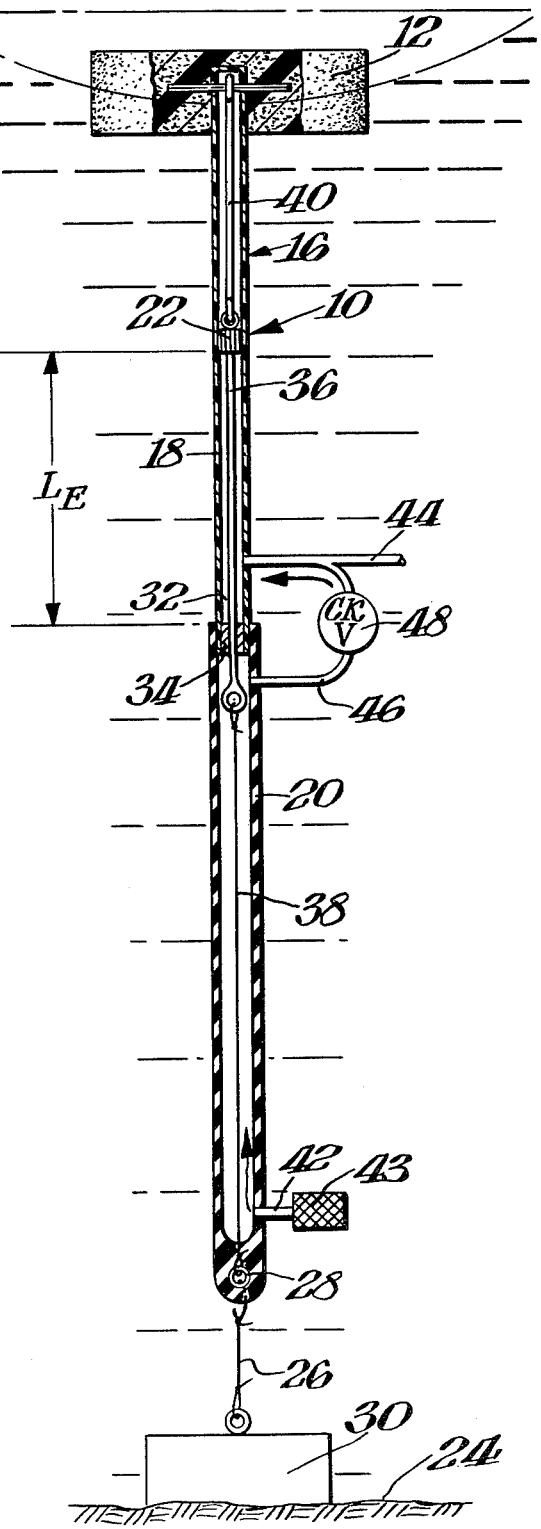

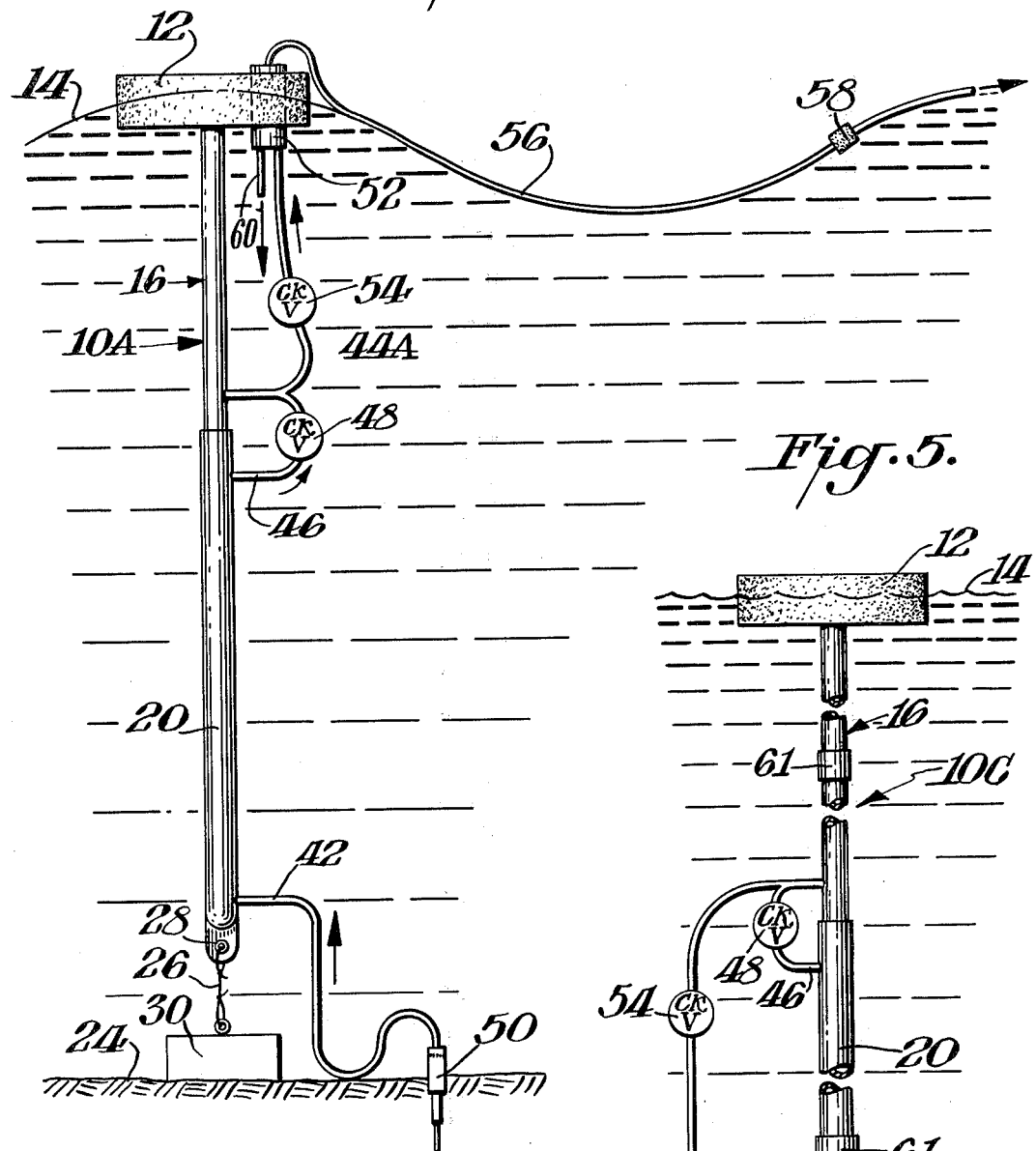

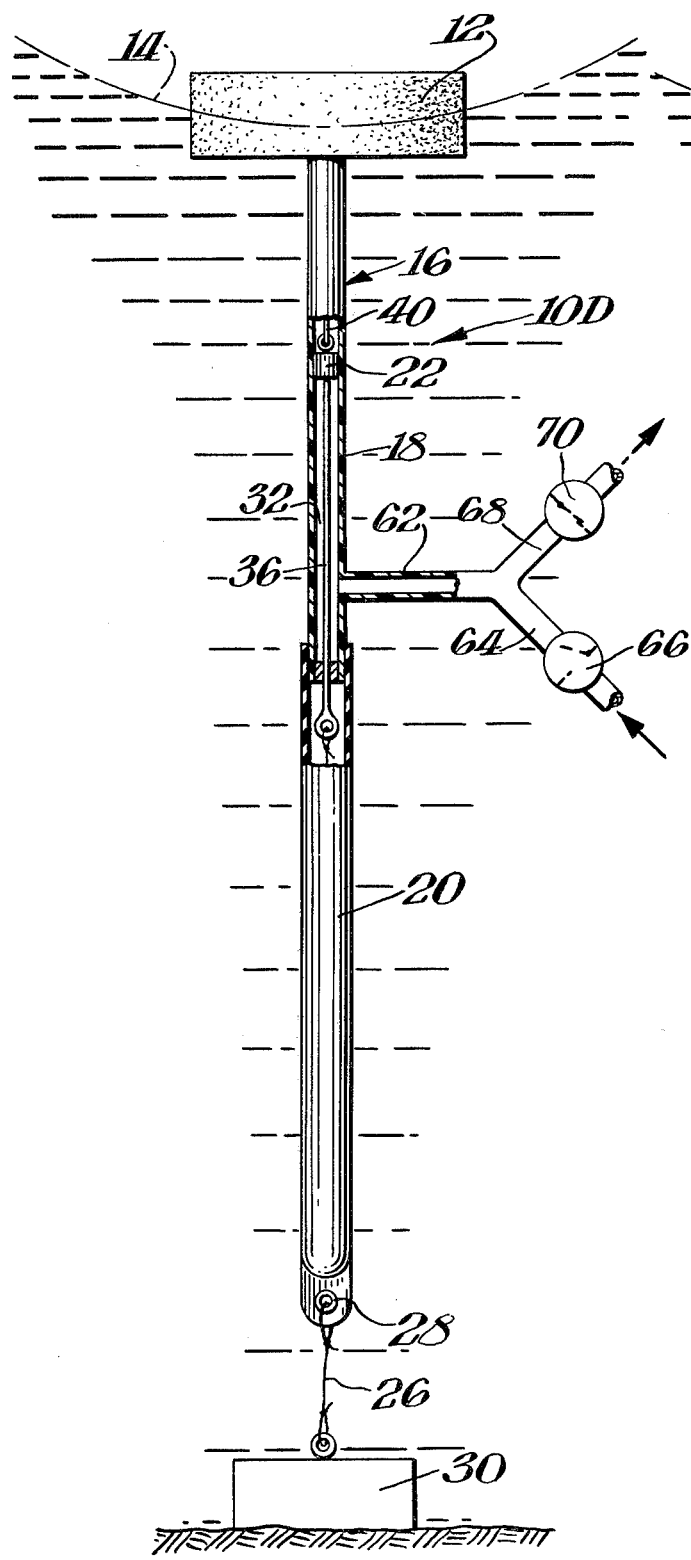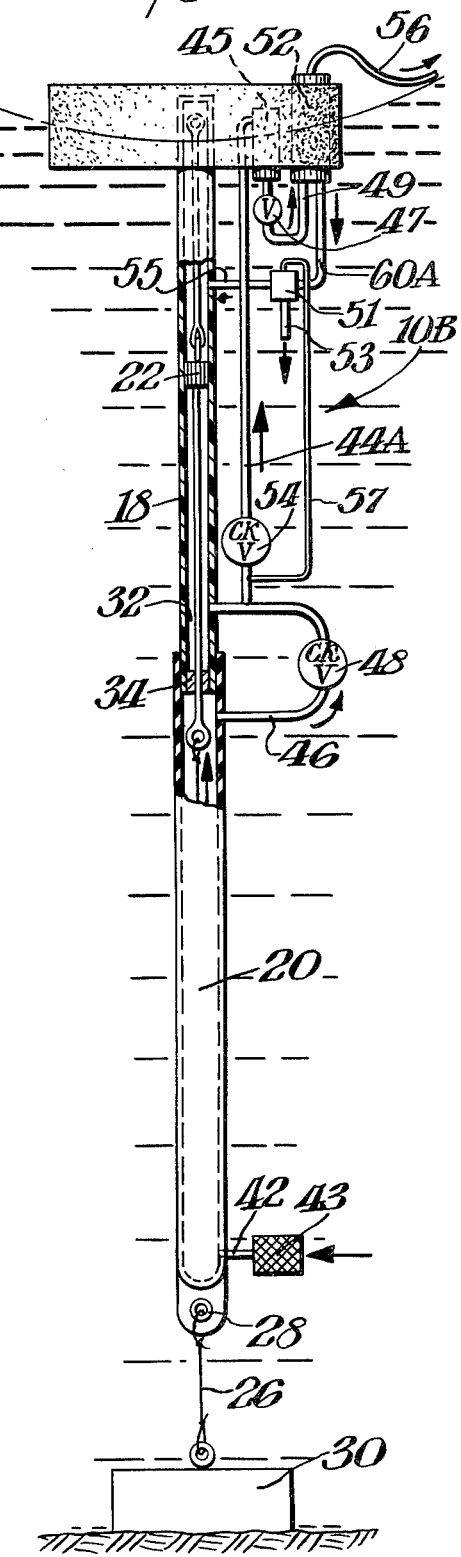

WAVE DRIVEN PUMP

BACKGROUND OF INVENTION

Applicants' co-pending application Ser. No. 76,217 filed Sept. 17, 1979 (i.e. the Hicks/Pleass application) relates to a wave powered desalination apparatus which incorporates a pressurized piston pump for delivering raw seawater under substantial pressure to desalination means such as a reverse osmosis device. The Hicks/Pleass application points out the need for such a device and the advantages resulting from the particular device described therein. In addition to the general need for an effective desalination device, it would also be desirable if use could be made of wave movements to provide not only an improved desalination device but also to accomplish other desirable results. For example, with the growing interest in mariculture, it would also be desirable if some means could be provided whereby the nutrient rich bottom water could be transported closer to the water surface so as to aid in mariculture.

SUMMARY OF INVENTION

An object of this invention is to provide a pump which derives its pumping action from wave movements.

A further object of this invention is to provide such a wave driven pump and method for use thereof which could be utilized as a means of transporting seawater to a desalination apparatus.

A still further object of this invention is to provide such a wave driven pump and method of use thereof which could be utilized as an aid in mariculture.

A yet further object of this invention is to provide such a wave driven pump and method of use thereof which could be utilized to transport seawater from one location to another regardless of intended end use.

In accordance with this invention, a wave driven pump is provided which includes a buoyant wave follower having a piston cylinder arrangement depending therefrom. The lower end of the cylinder is moored to the sea floor, and the piston itself is also moored so that its vertical position is generally constant. The pump includes means whereby the portion of the cylinder around the piston moves up and down with respect to the piston so that a pumping chamber located below the piston would increase and decrease in volume in accordance with the wave movements so as to pump the seawater out of the pumping chamber.

Where high pressure and low volume are obtained, the seawater could be pumped to a desalination apparatus such as a reverse osmosis module. Where the pump produces low pressure and high volume, an artificial upwelling can be achieved whereby, for example, nutrient rich bottom water could be transported closer to the water surface.

The cylinder or elongated body member which extends from the buoyant wave follower may include a rigid tubing section in which the piston is housed with a bushing being provided upstream from the piston so as to define a pumping chamber between the piston and bushing. A portion of the cylinder below the bushing may be made of a resilient elastic material so as to permit that portion to stretch and contract when the wave follower pulls the rigid tubing up and down in response to wave movements. The piston itself may be connected to the wave follower by a resilient elastic line or shock cord which would permit the piston to maintain its generally stationary vertical position while the shock cord itself stretches and contracts.

Where the pump is used for desalination purposes, the reverse osmosis module may be mounted directly on the sea floor. In an advantageous form of this invention where the reverse osmosis module is mounted to the wave follower, the brine discharge line leads from the reverse osmosis module to a fluidic switch having a drain line and a line leading to the cylinder above the piston so that during the proper half of the pressure cycle the waste high pressure brine will exert a downward force against the piston to aid the pressure stroke.

THE DRAWINGS

FIG. 1 is a side elevation view partly in section schematically showing a wave driven pump in accordance with this invention;

FIG. 2 is a view similar to FIG. 1 showing the device in a different stage of operation;

FIG. 3 is an elevation view showing an alternative form of the device of FIGS. 1-2;

FIG. 4 is an elevation view of a portion of yet a further embodiment of this invention;

FIG. 5 is an elevation view of yet another form of this invention; and

FIG. 6 is an elevation view partly in section of still yet another form of this invention.

DETAILED DESCRIPTION

Hicks/Pleass application Ser. No. 76,217 filed Sept. 17, 1979 relates to an apparatus which includes a pressured piston pump which delivers raw seawater under substantial pressure to desalination means such as a reverse osmosis device. The details of that application are incorporated herein by reference thereto. The present invention likewise relates to a pump and has particular utility as an adjunct to seawater salination. The present invention, however, is not limited to that end use but may also be practiced for other purposes such as facilitating mariculture. Reference is made to application Ser. No. 112,448, filed Jan. 16, 1980 in the name of C. M. Pleass which also relates to a wave driven pump having particular utility among other purposes in aiding mariculture. The details of that application are also included herein by reference thereto.

FIGS. 1-2 illustrate one embodiment of a wave driven pump 10 in accordance with this invention. As illustrated therein, wave driven pump 10 includes a buoyant wave follower 12 which floats at the water surface 14. Wave follower 12 is preferably of the non-Archimedean type as described in both of the aforenoted applications. Connected to and depending from wave follower 12 is an elongated hollow body member 16 which functions as the cylinder portion of a piston cylinder assembly. In the preferred form of this invention body member or cylinder 16 includes at least two distinct sections. One of the sections 18 is made of a rigid tubing with the other section 20 secured thereto being made of resilient elastic material. Mounted within rigid section 18 is a piston 22. The lower end of cylinder 16 is moored to the sea floor 24 by any suitable means such as a tether 26 being secured at one end to reinforced mooring eye 28 while the other end is secured to anchor or weight 30. Within cylinder 16 is a pumping chamber 32. Pumping chamber 32 is closed at one end by piston 22 and at the other end by bushing 34. Piston 22 is maintained in a generally constant vertical position by also being moored to the sea floor. For example, in the illustrated embodiment, piston 22 includes a non-elastic piston rod 36 to which is secured a non-elastic link such as flexible wire 38 which in turn is secured to mooring eye 28. Piston 22 is also secured to wave follower 12 by an elastic link or shock cord 40.

Because of the elastic section 20 of cylinder 16 and because of elastic shock cord 40, as wave follower 12 moves up and down in response to the wave movement, elastic shock cord 40 correspondingly expands and contracts while piston 22 remains at constant level. The up and down movement causes rigid tubing 16 to vertically reciprocate with respect to piston 22 correspondingly moving bushing 34 toward and away from piston 22 which in turn expands and contracts the volume or capacity of pumping chamber 32. FIG. 1, for example, illustrates the condition of pump 10 when a wave has caused an expansion of the elastic elements of pump 10. As is apparent, pumping chamber 32 has contracted to a minimum length $L_c$ which in turn corresponds to a minimum volume or capacity. FIG. 2 illustrates pump 10 when the wave has caused the elastic elements to contract. Since water surface 14 is now lower, rigid tubing 16 has moved closer to the sea floor thereby moving bushing 34 further away from piston 22 so that the length of pumping chamber 32 has now expanded to $L_E$ which would correspond to a larger volume or capacity. The constant expansion and contraction which takes place in pump 10 thereby creates a pumping action which is utilized by this invention. In this regard pumping chamber 32, as later described, is provided with a seawater inlet and outlet so that water may enter pumping chamber 32 during the downward stroke of rigid tubing 16 and then be discharged from pumping chamber 32 when its capacity is decreased by the upward stroke of rigid tubing 16.

FIGS. 1-2 show one arrangement for the inlet and outlet means. As indicated therein, an inlet line or tubing 42 is provided in the lower portion of elastic section 20. Inlet line 42 may lead to a sand well which filters the seawater entering cylinder 16 or may be a short tubing with its own filter 43 or may simply be an opening in section 20 covered by a filter. An outlet line 44 is also provided communicating with pumping chamber 32. Although rod 36 extends through bushing 34, communication between pumping chamber 32 and the hollow interior of elastic section 20 is essentially closed by bushing 34. Thus a bypass line 46 is provided so that the hollow interior of elastic section 20 communicates with pumping chamber 32. A suitable one way valve or check valve 48 would also be provided to prevent seawater from flowing from pumping chamber 32 into elastic section 20.

The arrangement of FIGS. 1-2 may be used for any end purpose where it is desired to transport seawater from one location to another. For example, the arrangement may be used as an aid in mariculture where the nutrient rich bottom water would enter cylinder 16 and then would be discharged at any level such as near the water surface 14 in accordance with where discharge line 44 terminates. The concepts of this invention may similarly be practiced if it were desired to transport, for example, oxygen rich surface water to a lower level. In such a variation the check valves of FIGS. 1-2 could be reversed in flow direction.

FIG. 3 shows a practice of this invention wherein the seawater is discharged for desalination purposes. Pump 10A is generally constructed as previously described with respect to FIGS. 1-2. FIG. 3 also illustrates the sand well 50 which connects with inlet line 42. Discharge line 44 is, however, illustrated in FIG. 3 as leading to a conventional reverse osmosis module 52 which, for the sake of convenience, is mounted to wave follower 12. Discharge line 44A also includes a suitable valve 54 to prevent seawater from flowing upstream. Reverse osmosis module 52 includes a fresh water discharge line 56 which may, for example, lead to shore. Any suitable number of floats 58 may be provided for fresh water discharge line 56. Reverse osmosis module 52 also includes a brine discharge line 60 which, in the illustrated embodiment, would discharge the brine back into the sea.

FIG. 4 illustrates a variation 10B of the device shown in FIG. 2. The main difference is that brine discharge line 60A includes a branch line 55 which leads back into cylinder 16 in the portion of rigid tubing 18 above piston 22. This embodiment is particularly advantageous in that during the proper half of the pressure cycle by any suitable logic switches the waste high pressure brine applies a downward force against piston 22 thereby aiding the pressure stroke.

In the illustrated embodiment of FIG. 4, seawater flows through line 44A into accumulator bottle or container 45. As the seawater accumulates in bottle 45, the head of air at the top of accumulator bottle 45 becomes compressed, and when it reaches a predetermined value, such as 800 psi, relief valve 47 is then opened and the seawater flows through line 49 into reverse osmosis module 52. The provision of accumulator bottle 45 acts to assure a smooth rather than pulsating flow of seawater to reverse osmosis module 52. Fresh water is then discharged to shore from reverse osmosis module 52 through discharge line 56, and the brine discharges from reverse osmosis module 52 through brine discharge 60A which leads to a fluidic switch 51 having one branch 53 for draining back to the surrounding water and another branch 55 leading to rigid tubing 18 above piston 22. Fluidic switch 51 may be of any suitable commercially available type. In the illustrated embodiment a thin sensing tube 57 extends from fluidic switch 51 back to pumping chamber 32 such as by connecting with line 44A upstream from check valve 54. By this connection, sensing line or tube 57 can sense the amount of pressure of the seawater being forced from pumping chamber 32 and thereby control the operation of fluidic switch 51. For example, at the end of a stroke when the wave crest has passed and as much of the water as possible has been pumped out of pumping chamber 32, the pressure in chamber 32 would drop from 800 psi to ambient. This drop in pressure would be detected by sensing line 57 and would cause communication with branch 55 to close, and communication with drain branch 53 to open whereby the brine would drain into the surrounding seawater during the low pressure half cycle. When the predetermined pressure of, for example, 800 psi is again sensed by sensing line 57, fluidic switch 51 would then make branch 55 operative to feed the brine into cylinder 18.

FIG. 5 shows yet another variation 10C of this invention which is used for desalination purposes. In this embodiment, reverse osmosis module 52 is mounted on the sea floor 24 such as being disposed in a concrete block 63. The high pressure discharge line 44A thus leads downwardly from the pumping chamber 32 to reverse osmosis module 52. The desalinated or fresh water would exit through discharge line 56A which could lie along the sea floor and eventually terminate at shore. Reverse osmosis module 54 would also include a brine discharge line 60.

In the embodiment of FIGS. 1–5, the water inlet means is illustrated as being in the bottom of the elastic section 20. Thus, a substantial length of body member or cylinder 16 functions as a water column. FIG. 6 shows an alternative practice 10D of this invention wherein it is not necessary to utilize such a great portion of the cylinder as a water column. As illustrated therein, a Y-shaped tubing 62 communicates with pumping chamber 32. Y-shaped tubing 62 includes an inlet branch 64 having a one way valve 66 and an outlet branch 68 having a one way valve 70. Inlet branch 64 may lead to any desired location such as a sand well to provide a means whereby water may enter pumping chamber 32 upon the downward movement of rigid tubing 18 which results in the expansion of pumping chamber 32. The seawater would then be pumped from pumping chamber 32 and discharged to any convenient location from discharge branch 68 upon the upward movement of rigid tubing 18 which in turn causes a contraction of pumping chamber 32.

Any suitable materials and dimensions may be used in the practice of this invention. Where desalination is intended, the materials and dimensions should be so selected as to enhance the obtaining of high pressure, low volume pumping. In this respect, a pressure of 800 psi would be preferred for a reverse osmosis module. Conversely, where other purposes, such as mariculture, is intended, the materials and dimensions should be selected to produce low pressure and high volume so as to cause the desired artificial upwelling.

Wave follower 12 may, for example, be dimensioned and made of materials as discussed in the aforenoted two applications. Rigid tubing section 18 may be made, for example, of conventional drainage tubing such as polyvinylchloride tubing wrapped with fiberglass tape for added rigidity which would provide a bursting strength up to 1000 psi or, for example, Adiprene ® L315. Resilient elastic section 20 may be made of any suitable elastomer such as urethane or natural rubber or Adiprene ® L100 to permit the required stretching in accordance with the wave movements. Urethane elastomers are particularly advantageous because they are notably abrasion resistant and generally unaffected by seawater thus affording good protection against fish bites, sand abrasion and the like. Similarly shock cord or link 40 is made of a suitable soft elastomeric material to act as a return spring. Where used at water depths of about 60θ70 feet, their rigid section may be about 6–8 feet long with a four inch diameter while the elastic section 20 would be about 50–60 feet long. Where used at greater depths such as 1000–2000 feet, cylinder 16 could be from 1000–1900 feet long and tether 26 from less than 10 feet to less than 1000 feet long. Rigid tubing 18 could have an outside diameter of 2–4 feet and an inside diameter of 1 foot 9 inches to 3 feet 6 inches. Elastic section 20 could be of a diameter dimensioned for tubing 18 to snugly telescope therein or may be of the same diameter mechanically coupled thereto. Wave follower 12 would have, for example, a diameter of about 15 feet and may be Archimedean or non-Archimedean. Tubing 18 may be secured to wave follower 12 in any suitable manner such as by means of a rod extending through holes in tubing 18 with the upper end of shock cord 40 secured to the rod as illustrated in FIGS. 1–2. Piston 22 may be made of any suitable materials such as a Teflon plug or an Adiprene casting. It would be desirable to lubricate the space between the piston 22 and the inner wall of rigid tubing 18 by, for example, providing small holes leading back to the pressure space. Bushing 34 may be made of, for example, nylon or Teflon. It should be appreciated that while theoretically it is preferred to make the various fits and connections completely water tight, such water tightness is not absolutely necessary and may be sacrificed to some degree for the sake of economy. Rigid tubing 18 may be connected to elastic section 20 in any suitable manner such as by a mechanical coupling or any suitable adhesive. Additionally each section 18 and 20 may comprise a single section in itself or each section may be comprised of a plurality of individual sections joined together. FIG. 5, for example, illustrates a plurality of pre-fabricated sections joined together by mechanical couplings 61 for each of portions 18, 20. Cylinder 16 may be of uniform or varying diameter. Piston rod 36 may likewise be made of any suitable material such as Adiprene ® L315 or stainless steel, and flexible wire 38 may be of any suitable material such as Kevlar. Tether 26 may be of any suitable material such as mooring chain, non-corrodible wire rope or synthetic rope.

Where the device is used for desalination purposes, the outlet tubing could be of generally small diameter compared to cylinder 16 particularly since the outlet tubings function as high pressure lines. Further, although one way flapper type valves are illustrated, other forms of valves or urging means may be used including those described in the aforenoted Pleass application.

The invention may be advantageously practiced where a plurality of such pumps are used in one general area with each pump having a diameter of a few feet. The use of a plurality of small pumps may be more practical than one giant size pump.

What is claimed is:

1. A wave driven pump comprising a buoyant wave follower for floating at the water surface, an elongated hollow body member connected to and depending from said wave follower for extending toward the sea floor, said body member including means for mooring said body member to the sea floor, a piston in said body member having means for mooring to the sea floor whereby the relative distance between said piston and the sea floor is maintained generally constant, said body member including a hollow cylinder connected to said wave follower and disposed around and in contact with said piston, a pumping chamber in said cylinder upstream from said piston with one end of said pumping chamber being closed by said piston, said cylinder including a bushing defining the opposite end of said pumping chamber remote from said piston inlet means communicating with said pumping chamber and adapted to communicate with the surrounding sea water, outlet means communicating with said pumping chamber for the discharge of seawater therefrom, and means for expanding and contracting the volume of said pumping chamber in response to wave movements for creating a pumping action which causes sea water to flow into said pumping chamber and then be pumped therefrom and a portion of said elongated hollow body member being made of a resilient elastic material to permit said member to change in length in accordance with the position of said wave follower.

2. The wave driven pump of claim 1 wherein a further portion of said cylinder is made of a rigid tubing, said piston and at least a portion of said pumping chamber being located in said rigid tubing, and said rigid tubing being capable of sliding up and down with respect to said piston in accordance with the position of said wave follower whereby the volume of said pumping chamber is dependent on the position of said rigid tubing.

3. The wave driven pump of claim 2 wherein said piston is connected to said wave follower by a resilient elastic link in said cylinder and said resilient elastic link being capable of altering its length in accordance with the position of said follower, and said piston mooring means including a rod extending from said piston through said bushing, and a non-elastic link secured to said rod and connected to said body member mooring means.

4. The wave driven pump of claim 1 wherein said inlet means comprises an inlet line communicating with said cylinder upstream from said bushing in an upstream section of said cylinder, a bypass line connecting said upstream section with said pumping chamber, one way valve means in said bypass line, and said outlet means being a discharge line leading from said pumping chamber.

5. The wave driven pump of claim 1 wherein said inlet means comprises an inlet line leading to and communicating with said pumping chamber, said outlet means comprising a discharge line leading from and communicating with said pumping chamber, and one way valve means in said inlet line and in said discharge line.

6. The wave driven pump of claim 1 including a reverse osmosis module for desalinating seawater, said reverse osmosis module having a fresh water discharge line and a brine discharge line, and said outlet means communicating with said reverse osmosis module for supplying pumped seawater to said reverse osmosis module.

7. The wave driven pump of claim 6 wherein said reverse osmosis module is mounted to said wave follower.

8. The wave driven pump of claim 6 wherein the brine discharge line communicates with said cylinder in back of said piston for applying a downward force against said piston and aiding the pressure stroke.

9. The wave driven pump of claim 8 including an accumulator bottle upstream from and in flow communication with said reverse osmosis module, said brine discharge line leading to and communicating with a fluidic switch, said fluidic switch having a drain branch and a branch communicating with said cylinder for periodically directing the brine to said cylinder during the proper half of the pressure cycle.

10. The wave driven pump of claim 6 including means for mounting said reverse osmosis module on the sea floor.

* * * * *

UNITED STATES PATENT AND TRADEMARK OFFICE
CERTIFICATE OF CORRECTION

PATENT NO. : 4,326,840

DATED : April 27, 1982

INVENTOR(S) : Douglas C. Hicks & Charles M. Pleass

It is certified that error appears in the above—identified patent and that said Letters Patent is hereby corrected as shown below:

At col. 1. line 5 following "BACKGROUND OF THE INVENTION" the patent should read -- The Government has rights in this invention pursuant to grant No. NA800AA-D-00106 awarded by the U. S. Department of Commerce --.

Signed and Sealed this

Fourteenth Day of September 1982

[SEAL]

Attest:

*Attesting Officer*

GERALD J. MOSSINGHOFF

*Commissioner of Patents and Trademarks*